United States Patent Office 2,782,111
Patented Feb. 19, 1957

2,782,111
PLANT GROWTH REGULATING COMPOSITIONS

Herman S. Bloch, Chicago, and Alfred E. Hoffman, Clarendon Hills, Ill., assignors to Universal Oil Products Company, Des Plaines, Ill., a corporation of Delaware No Drawing. Application October 27, 1952,
Serial No. 317,164

2 Claims. (Cl. 71—2.6)

This application is a continuation-in-part of our copending application Serial No. 130,352, filed November 30, 1949, now abandoned.

This invention relates to new compositions of matter useful in regulating the growth of plants, and particularly useful for killing weeds in an active stage of growth.

The term "weed" is used in its broadest definition to refer to a plant which grows where it is not wanted. This usage is broad enough to include undesired broad leaf plants as plantain, dandelions, thistles, bindweeds, ragweeds, poison ivy, poison oak, and many others, as well as certain desirable plants and lawn grasses growing on driveways, brick and stone walks, etc.

An object of this invention is to provide an improved composition for eradicating weeds in an active stage of growth.

Another object of this invention is to provide a composition in which several of the components thereof are active in killing weeds.

One embodiment of this invention relates to a plant growth regulating composition comprising essentially an alkyl aromatic compound, said alkyl aromatic compound containing from 9 to 13 carbon atoms per molecule, and a compound selected from the group consisting of halogenated aryloxy monocarboxylic aliphatic acids, their salts, esters, amides, thioamides, and nitriles.

A further embodiment of this invention relates to a plant growth regulating composition comprising an alkyl benzene hydrocarbon, said alkyl benzene hydrocarbon containing from 9 to 13 carbon atoms per molecule, and a compound selected from the group consisting of halogenated aryloxy monocarboxylic aliphatic acids, their salts, esters, amides, thioamides, and nitriles.

A still further embodiment of this invention relates to a plant growth regulating composition comprising an alkyl naphthalene hydrocarbon, said alkyl naphthalene hydrocarbon containing from 11 to 13 carbon atoms per molecule, and a compound selected from the group consisting of halogenated aryloxy monocarboxylic aliphatic acids, their salts, esters, amides, thioamides, and nitriles.

Our new compositions of matter which are useful in regulating the growth of plants contain from about 0.02 to about 10% by weight of a plant growth regulating chemical compound dissolved in an alkyl aromatic compound. These different alkyl aromatic compounds may contain one or more aromatic rings and thus include phenyl compounds and naphthyl compounds. Among the alkyl aromatic compounds we have found useful in killing weed composition are cumene, cymenes, amyl benzene, methyl naphthalenes and dimethyl naphthalenes. We have found that the most effective of these contain about 11 carbon atoms per molecule, or, broadly speaking, fall within the more general specification of alkyl aromatic compounds containing from 9 to 13 carbon atoms per molecule. We have unexpectedly found that alkyl aromatic hydrocarbons which fall within this generic definition exhibit a weed killing effect in conjunction with the halogenated aryloxy monocarboxylic acids and their derivatives which is, in many cases, greater than an additive effect. Examples of other alkyl aromatic hydrocarbons include normal propyl benzene, normal butyl benzene, isobutyl benzene, secondary butyl benzene, tertiary butyl benzene, isomeric amyl benzenes, isomeric hexyl benzenes, and isomeric heptyl benzenes, ethyl toluene, propyl toluene, butyl toluene, amyl toluene, hexyl toluene, diethyl benzene, propyl ethyl benzene, butyl ethyl benzene, amyl ethyl benzene, dipropyl benzene, butyl propyl benzene, trimethyl benzene, tetramethyl benzene, pentamethyl benzene, hexamethyl benzene, etc., the methylbiphenyls, trimethyl naphthalene, ethyl naphthalene, ethyl methyl naphthalene, and propyl napthalene.

We have found that alkyl aromatic hydrocarbons such as those mentioned above are well adapted as solvents for halogenated aryloxy monocarboxylic acids, their derivatives, and related plant growth regulating substances, since these alkyl aromatic hydrocarbons exert a synergistic effect, the mixture having a weed-killing activity greater than that of either of the components of the mixture when applied individually to the weeds. Also many of the alkyl aromatic hydrocarbons employed as solvents for the halogenated aryloxy monocarboxylic aliphatic acids and their derivatives have high activity for killing weeds and grasses. While the term synergism is used in the specification in its normal or standard sense, it must be understood that this effect is more than a little difficult to evaluate with living plants. Such factors as the state of health of the individual plant, the age of the plant, the life history of the plant as affected by rainfall, heat, cold, etc., all enter into the measurements of synergism and thus the results obtained in any single test may be inconclusive. However, the authenticity of such a synergistic effect may be established by demonstrating it in a sufficient number of single tests. By such a procedure, we have established that the synergism as alleged is real and measureable.

Plant growth regulator compounds which are composited with one or more of the aromatic compounds of the type hereinabove set forth comprise essentially halogenated aryloxy monocarboxylic aliphatic acids, their salts, esters, amides, thioamides, and nitriles, thus including, for example, 2,4-dichlorophenoxy acetic acid (usually referred to as 2,4-D), 2,4,5- and 2,4,6-trichlorophenoxy acetic acid (sometimes referred as TCP), 2-cholor- and 4-chlorophenoxyacetic acid, alpha-(2-chlorphenoxy) propionic acid and the like, together with their salts and their simple derivatives such as nitriles, amides, and esters of cyclic-alcohols, polyhydric-alcohols, amino-alcohols, ether-alcohols such as butoxy-ethanol and the like. Solutions of these materials may be used as such or in some cases they may be emulsified in water with or without the aid of an emulsifying agent.

The compositions herein disclosed may be used to kill undesirable plants such as weeds, in some cases selectively. If the concentration of the herbicide composition is carefully controlled, it may be used with relatively little harm to desirable grasses such as blue grass, red top, and fescues, while at the same time it is fatal to weeds such as bindweed, buttercup, chaerophyllum, chickweed, cinquefoil, cress, dandelion, dichondra, dock, fleabane, gill-over-the-ground, heal-all, henbit, knotweed, lamb's quarters, lespedeza, lippia, round-leaved mallow, moneywort, mustard, onion, pennywort, peppergrass, pigweed, both broad and narrow leaf plantain, poison ivy pussytoes, ragweed, sheep sorrel, shepherd's purse, speedwell, sumac, thistle, veronica, and whitlow. The exact concentrations required for a selective effect can be readily determined by experimentation in each case, and are dependent on the nature of the growth regulator used, the structure of the aromatic compound, the ratio of the regulator to the aromatic compound, the temperature prevalent during the period of use, the combination of plants being treated, and similar factors.

Some but not all of the plant growth regulator compounds referred to above are plant hormones in that they may be used to promote plant growth when employed in a small concentration as in the form of dust or solutions. However, for the purpose of the present invention, these compounds are used in higher concentrations for killing weeds than the concentrations that are used for plant growth promotion.

The plant growth regulating compositions of this invention appear to be absorbed by growing plants and to be transmitted through the tissues of the plant to the roots and thus are effective in killing the entire plant including its roots rather than in merely killing the leaves or top portion of the plant which has been in contact with the weed killing composition including the aromatic compound.

A preferred method of using the composition of this invention for killing weeds is to spray the weed infested area with a solution containing from about 0.02 to about 10% by weight of a halogenated aryloxy monocarboxylic aliphatic acid or other plant growth regulator dissolved in an aromatic compound, the spraying being done preferably when the atmospheric temperature is 70° F. or higher and being carried out so that from about 1 to about 5 pounds of the halogenated aryloxy monocarboxylic aliphatic acid or its derivative is applied per acre of weed infested area. Effective control of broad leaf type weeds is generally effected by applying from about 5 to about 25 gallons of total weed killer composition (that is aromatic compound plus plant growth regulator compound) per acre of weed infested area. It is also possible to effect some weed control employing smaller amounts of the weed killer composition when it is applied in the form of an emulsion or suspension in water, such emulsion being produced generally with the aid of an emulsifying or wetting agent such as an alkylaryl sulfonate, a polyoxyalkylene derivative of a fatty acid, a polyoxyalkylene ether alcohol, a fatty acid soap of an alkali metal, etc.

The following examples are given to illustrate compositions useful for killing weeds although these data are given with no intention of limiting unduly the generally broad scope of the invention.

Adjacent and also overlapping areas of a weed overgrown plot were sprayed with an aromatic compound, with an aromatic compound containing the butoxyethanol ester of 2,4-dichlorophenoxy acetic acid or 2,4,5-trichlorophenoxy acetic acid, in the amount of 11.1 and 11.6 grams per pint respectively, and with the latter esters in the same concentration in a deodorized kerosene, the spraying being conducted in such a fashion as to apply one-third pint per 100 square feet of area which corresponds to a coverage of 2.5 pounds of phenoxy acetic acid per acre where this was used.

The results obtained in the above indicated field test in which weed plots were sprayed with various aromatic compounds and mixtures of aromatic compounds and the phenoxy acetic acids are indicated in the following tables in which is shown a more effective eradication of weeds with the combination of ester and aromatic compound than was obtained with the aromatic solvent alone or with the ester in deodorized kerosene:

TABLE I

*Herbicidal evaluation of various alkylaromatic hydrocarbons on fine grass*

| Hydrocarbon | Herbicide [a] | Duration of Test, Days | | | |
|---|---|---|---|---|---|
| | | 1 | 5 | 12 | 16 |
| 1. Bland solvent | None | 0 | 0 | 0 | |
| 2. Bland solvent | 2,4-D | 0 | 0 | 0 | |
| 3. Sec-butyl benzene | None | | | | |
| 4. Sec-butyl benzene | 2,4-D | 3 | 5 | 5 | 5 |
| 5. Amylbenzenes | None | 5 | 5 | 5 | 5 |
| 6. Amylbenzenes | 2,4-D | 5 | 5 | 5 | 5 |
| 7. Isopropyl toluene | None | | | | |
| 8. Isopropyl toluene | 2,4-D | 1 | 1 | 1 | 1 |

Toxicity Rating: 5=complete kill; 0=no effect.
[a] 11.1 g. 2,4-D ester per pint.

TABLE II

*Herbicidal evaluation of various alkylaromatic hydrocarbons on broad grass*

| Hydrocarbon | Herbicide [a] | Duration of Test, Days | | | |
|---|---|---|---|---|---|
| | | 1 | 5 | 12 | 16 |
| 1. Bland solvent | None | 0 | 0 | 0 | |
| 2. Bland solvent | 2,4-D | 0 | ½ | 0 | 1 |
| 3. Isopropyl benzene | None | 2 | 1 | 1 | 1 |
| 4. Isopropyl benzene | 2,4-D | 2 | 3 | 3 | 3 |
| 5. Sec-butyl benzene | None | 1 | 3 | 3 | 2 |
| 6. Sec-butyl benzene | 2,4-D | 2 | 4 | 5 | 5 |
| 7. Amylbenzene | None | 4 | 4 | 2 | 2 |
| 8. Amylbenzene | 2,4-D | 4 | 4 | 3 | 3 |
| 9. Methyl naphthalene | None | 2 | 4 | 4 | 4 |
| 10. Methyl naphthalene | 2,4-D | 4 | 5 | 5 | 5 |

Toxicity rating: 5=complete kill; 0=no effect.
[a] 11.1 g. 2,4-D ester per pint.

TABLE III

*Herbicidal evaluation of various alkylaromatic hydrocarbons on crab grass*

| Hydrocarbon | Herbicide [a] | Duration of Test, Days | | | |
|---|---|---|---|---|---|
| | | 1 | 5 | 12 | 16 |
| 1. Bland solvent | None | 0 | 0 | 0 | |
| 2. Bland solvent | 2,4-D | 1 | 2 | 2 | |
| 3. Isopropyl benzene | None | 1 | 3 | 3-4 | 4 |
| 4. Isopropyl benzene | 2,4-D | 3 | 4 | 5 | 5 |
| 5. Isopropyl toluene | None | 0 | 0 | 0 | 0 |
| 6. Isopropyl toluene | 2,4-D | 0 | 2 | 3 | 3 |

Toxicity rating: 5=complete kill; 0=No effect.
[a] 11.1 g. 2,4-D ester per pint.

TABLE IV

*Herbicidal evaluation of various alkylaromatic hydrocarbons on clover*

| Hydrocarbon | Herbicide [a] | Duration of Test, Days | | | |
|---|---|---|---|---|---|
| | | 1 | 5 | 12 | 16 |
| 1. Bland solvent | None | 0 | 0 | 0 | |
| 2. Bland solvent | 2,4-D | 0 | 1 | 0 | |
| 3. Isopropyl toluene | None | 1 | 1 | 0 | 0 |
| 4. Isopropyl toluene | 2,4-D | 2 | 4 | 4-5 | 5 |
| 5. Methyl naphthalene | None | 0 | 1 | 1 | 1 |
| 6. Methyl naphthalene | 2,4-D | 4 | 5 | 5 | 5 |

Toxicity rating: 5=complete kill; 0=no effect.
[a] 11.1 g. 2,4-D ester per pint.

TABLE V

*Herbicidal evaluation of various alkylaromatic hydrocarbons on dandelions*

| Hydrocarbon | Herbicide [a] | Duration of Test, Days | | | |
|---|---|---|---|---|---|
| | | 1 | 5 | 12 | 16 |
| 1. Bland solvent | None | 0 | 0 | 0 | --- |
| 2. Bland solvent | 2,4-D | 2 | 4 | 4 | --- |
| 3. Isopropyl benzene | None | 4 | 4 | 4 | 4 |
| 4. Isopropyl benzene | 2,4-D | 2 | 3 | 5 | 5 |
| 5. Sec-butyl benzene | None | 2 | 3 | 5 | 5 |
| 6. Sec-butyl benzene | 2,4-D | 3 | 4 | 5 | 5 |
| 7. Tert-butyl benzene | None | 2 | 2 | 0 | 0 |
| 8. Tert-butyl benzene | 2,4-D | 2 | 3 | 4 | 5 |
| 9. Isopropyl toluene | None | 1 | 2 | 1 | 1 |
| 10. Isopropyl toluene | 2,4-D | 2 | 4 | 5 | 5 |
| 11. Methyl naphthalene | None | 1 | 2 | 2 | 1 |
| 12. Methyl naphthalene | 2,4-D | 4 | 5 | 5 | 5 |

Toxicity rating: 5=complete kill; 0=no effect.
[a] 11.1 g. 2,4-D ester per pint.

TABLE VI

*Herbicidal evaluation of various alkylaromatic hydrocarbons on plantain*

| Hydrocarbon | Herbicide [a] | Duration of Test, Days | | | |
|---|---|---|---|---|---|
| | | 1 | 5 | 12 | 16 |
| 1. Bland solvent | None | 0 | 0 | 0 | --- |
| 2. Bland solvent | 2,4-D | 2 | 4 | 4 | --- |
| 3. Isopropyl benzene | None | 4 | 4 | 4 | 4 |
| 4. Isopropyl benzene | 2,4-D | 2 | 4 | 5 | 5 |
| 5. Sec-butyl benzene | None | 2 | 3 | 5 | 5 |
| 6. Sec-butyl benzene | 2,4-D | 1 | 2 | 5 | 5 |
| 7. Tert-butyl benzene | None | 3 | 2 | 0 | 0 |
| 8. Tert-butyl benzene | 2,4-D | 2 | 3 | 4 | 5 |
| 9. Isopropyl toluene | None | --- | --- | --- | --- |
| 10. Isopropyl toluene | 2,4-D | 3 | 4 | 5 | 5 |
| 11. Methyl naphthalene | None | 1 | 2 | 2 | 2 |
| 12. Methyl naphthalene | 2,4-D | 4 | 5 | 5 | 5 |

Toxicity rating: 5=complete kill; 0=no effect.
[a] 11.1 g. 2,4-D ester per pint.

TABLE VII

*Herbicidal evaluation of various alkylaromatic hydrocarbons on red-stemmed vines*

| Hydrocarbon | Herbicide [a] | Duration of Test, Days | | | |
|---|---|---|---|---|---|
| | | 1 | 5 | 12 | 16 |
| 1. Bland solvent | None | 0 | 0 | 0 | --- |
| 2. Bland solvent | 2,4-D | 0 | 2 | 3 | --- |
| 3. Tert-butyl benzene | None | 1 | 0 | 0 | 0 |
| 4. Tert-butyl benzene | 2,4-D | 1 | 2 | 4 | 4 |
| 5. Methyl naphthalene | None | 2 | 4 | 4 | 5 |
| 6. Methyl naphthalene | 2,4-D | 3 | 4 | 5 | 5 |

Toxicity rating: 5=complete kill; 0=no effect.
[a] 11.1 g. 2,4-D ester per pint.

TABLE VIII

*Herbicidal evaluation of various alkylaromatic hydrocarbons on small vines*

| Hydrocarbon | Herbicide [a] | Duration of Test, Days | | | |
|---|---|---|---|---|---|
| | | 1 | 5 | 12 | 16 |
| 1. Bland solvent | None | 0 | 0 | 0 | --- |
| 2. Bland solvent | 2,4-D | 1 | 3 | 4 | --- |
| 3. Isopropyl benzene | None | 3 | 4 | 5 | 5 |
| 4. Isopropyl benzene | 2,4-D | 1 | 3 | 5 | 5 |
| 5. Sec.-butyl benzene | None | 2 | 3 | 4 | 4 |
| 6. Sec.-butyl benzene | 2,4-D | 1 | 3 | 5 | 5 |
| 7. Tert-butyl benzene | None | 1 | 1 | 0 | 0 |
| 8. Tert-butyl benzene | 2,4-D | 1 | 3 | 4 | 4 |
| 9. Amyl benzene | None | 4 | 4 | 5 | 5 |
| 10. Amyl benzene | 2,4-D | 2 | 4 | 5 | 5 |
| 11. Methyl naphthalene | None | 3 | 4 | 4 | 5 |
| 12. Methyl naphthalene | 2,4-D | 3 | 5 | 5 | 5 |

Toxicity rating: 5=complete kill; 0=no effect.
[a] 11.1 g. 2,4-D ester per pint.

Other tests carried out with the butoxyethanol ester of 2,4,5-trichlorophenoxy acetic acid dissolved in deodorized kerosene and in alkyl aromatic solvents showed that the latter mixture was more effective against woody plants but slightly less effective against non-woody plants than the above-described mixture containing the butoxyethanol ester of 2,4-dichlorophenoxy acetic acid.

TABLE IX

*Herbicidal evaluation of various alkylaromatic hydrocarbons on woody plants*

| Hydrocarbon | Herbicide [a] | Duration of Test, Days | | | | | |
|---|---|---|---|---|---|---|---|
| | | 1 | 4 | 6 | 11 | 15 | 35 |
| 1. Bland solvent | None | 0 | 0 | 0 | 0 | 0 | 0 |
| 2. Bland solvent | 2,4,5-T | 1 | 2 | 3 | 4 | 4 | 5 |
| 3. Isopropyl benzene | None | ½ | 1 | 1 | 1½ | 2 | 5 |
| 4. Isopropyl benzene | 2,4,5-T | 1½ | 3 | 3 | 4 | 4 | 5 |
| 5. Sec.-butyl benzene | None | 1½ | 2 | 2 | 3 | 3 | 3 |
| 6. Sec.-butyl benzene | 2,4,5-T | 3 | 4 | 4 | 4½ | 4½ | 5 |
| 7. Tert-butyl benzene | None | 2 | 3 | 4 | 4 | 4 | 5 |
| 8. Tert-butyl benzene | 2,4,5-T | 2 | 3 | 3 | 4 | 4 | 5 |
| 9. Amyl benzene | None | 4 | 4 | 4½ | 4½ | 5 | 5 |
| 10. Amyl benzene | 2,4,5-T | 3 | 4 | 4 | 5 | 5 | 5 |
| 11. Isopropyl toluene | None | 3 | 3 | 3 | 4 | 4 | 5 |
| 12. Isopropyl toluene | 2,4,5-T | 3 | 3 | 4 | 5 | 5 | 5 |
| 13. Methyl naphthalene | None | 4 | 5 | 5 | 5 | 5 | 5 |
| 14. Methyl naphthalene | 2,4,5-T | 4 | 5 | 5 | 5 | 5 | 5 |

Toxicity rating: 5=complete kill; 0=no effect.
[a] 11.6 g. 2,4,5-T ester per pint.

We claim as our invention:

1. A plant growth regulating composition consisting essentially of an alkylbenzene hydrocarbon, said alkylbenzene hydrocarbon containing from 9 to 13 carbon atoms per molecule, and a compound selected from the group consisting of halogenated aryloxy monocarboxylic aliphatic acids, their salts, esters, amides, thioamides, and nitriles.

2. A composition which is active for killing weeds in an active stage of growth which consists essentially of a solution consisting of an alkylbenzene hydrocarbon, said alkylbenzene hydrocarbon containing from 9 to 13 carbon atoms per molecule, and having dissolved therein from about 0.02 to about 10% by weight of a compound selected from the group consisting of halogenated aryloxy monocarboxylic aliphatic acids, their salts, esters, amides, thioamides, and nitriles.

References Cited in the file of this patent

UNITED STATES PATENTS

| | | |
|---|---|---|
| 2,390,941 | Jones | Dec. 11, 1945 |
| 2,450,543 | Flenner | Oct. 5, 1948 |
| 2,509,233 | Kaberg et al. | May 30, 1950 |
| 2,585,875 | Swaney et al. | Feb. 12, 1952 |

OTHER REFERENCES

Sachanen: "Chemical Constituents of Petroleum" (1945), pages 268 to 271.
"Science," Feb. 20, 1948, pages 196 and 197.
"Science," Sept. 10, 1948, pages 278 and 279.